United States Patent
Brütt et al.

(10) Patent No.: US 12,538,861 B2
(45) Date of Patent: Feb. 3, 2026

(54) METHOD FOR TRACTION CONTROL OF A VEHICLE OR A VEHICLE COMBINATION

(71) Applicant: ZF CV Systems Global GmbH, Friedrichshafen (DE)

(72) Inventors: Mirko Brütt, Springe (DE); Daniel Pfefferkorn, Hannover (DE); Jan Spremberg, Wennigsen (DE); Thomas Wolf, Barsinghausen (DE)

(73) Assignee: ZF CV Systems Global GmbH, Friedrichshafen (DE)

( * ) Notice: Subject to any disclaimer, the term of this patent is extended or adjusted under 35 U.S.C. 154(b) by 0 days.

(21) Appl. No.: 18/720,274

(22) PCT Filed: Nov. 23, 2022

(86) PCT No.: PCT/EP2022/082991
§ 371 (c)(1),
(2) Date: Jun. 14, 2024

(87) PCT Pub. No.: WO2023/110343
PCT Pub. Date: Jun. 22, 2023

(65) Prior Publication Data
US 2025/0040466 A1 Feb. 6, 2025

(30) Foreign Application Priority Data
Dec. 17, 2021 (DE) .................. 10 2021 133 758.5

(51) Int. Cl.
*A01B 76/00* (2006.01)
*B60L 15/20* (2006.01)

(52) U.S. Cl.
CPC .......... *A01B 76/00* (2013.01); *B60L 15/2054* (2013.01); *B60L 2200/40* (2013.01);
(Continued)

(58) Field of Classification Search
CPC . A01B 76/00; B60L 15/2054; B60L 2200/40; B60L 2240/421; B60L 2240/486;
(Continued)

(56) References Cited

U.S. PATENT DOCUMENTS 6,006,390 A * 12/1999 Bischel .................. E01H 1/00
15/82
6,044,318 A 3/2000 Bourdon et al.
(Continued)

FOREIGN PATENT DOCUMENTS

DE 10 2004 010 561 A1 9/2005
DE 10 2007 028 277 A1 1/2008
(Continued)

OTHER PUBLICATIONS

German Patent Office, German Search Report issued in German patent application No. 10 2021 133 758.5 (Aug. 10, 2022).
(Continued)

*Primary Examiner* — Mussa A Shaawat
(74) *Attorney, Agent, or Firm* — Finch & Maloney PLLC (57) ABSTRACT

A method for controlling traction of a wheeled vehicle or a vehicle combination having a tractor vehicle and at least one trailer vehicle. A sensor device on a coupling element of a trailer device transmits coupling forces in x, y, and z directions to the coupling element of the tractor vehicle, which are measured and emitted as force signals. From these force signals, an evaluation unit determines the coupling force acting in the respective vehicle direction and transmits them to a control unit. Traction of the tractor vehicle is adapted to suit the properties of the ground surface. Using sequences of the coupling forces, the dynamic fraction if filtered out and from these a characteristic value is determined and transmitted to the control unit. If the character-
(Continued)

istic value exceeds a limit value, then at least one measure to improve the traction of the tractor vehicle is carried out.

14 Claims, 6 Drawing Sheets

(52) U.S. Cl.
CPC ... *B60L 2240/421* (2013.01); *B60L 2240/486* (2013.01); *B60L 2250/16* (2013.01)

(58) Field of Classification Search
CPC ....... B60L 2250/16; B60D 1/248; B60D 1/62; B60W 2300/14; B60W 2520/00; B60W 40/06; G01L 5/16
See application file for complete search history.

(56) References Cited

U.S. PATENT DOCUMENTS

| | | | |
|---|---|---|---|
| 6,196,327 B1 | 3/2001 | Patel et al. | |
| 6,253,691 B1* | 7/2001 | McQuinn | A01C 7/208 111/925 |
| 6,604,035 B1* | 8/2003 | Wetzel | B60T 8/1708 701/72 |
| 8,002,065 B2 | 8/2011 | Glavinie et al. | |
| 8,983,739 B2* | 3/2015 | Faivre | G07C 5/0841 701/84 |
| 9,845,008 B2* | 12/2017 | Brownell | B60W 30/1886 |
| 10,442,256 B2* | 10/2019 | Baum | B60C 23/00354 |
| 10,464,379 B2* | 11/2019 | Hennig | B60C 23/002 |
| 10,676,141 B2* | 6/2020 | Schott | A01B 63/145 |
| 10,866,153 B2* | 12/2020 | Brütt | G01L 5/136 |
| 10,871,410 B2* | 12/2020 | Brütt | B60D 1/62 |
| 11,491,829 B2* | 11/2022 | Buhrke | B60C 23/08 |
| 11,904,702 B2* | 2/2024 | Flaum | B60L 15/38 |
| 2007/0205656 A1* | 9/2007 | Bitter | B60T 11/108 303/123 |
| 2007/0260385 A1* | 11/2007 | Tandy | B60T 8/248 303/140 |
| 2009/0255775 A1* | 10/2009 | Viaud | A01F 21/00 192/135 |
| 2015/0120103 A1* | 4/2015 | Keys, II | B60L 50/16 180/65.23 |
| 2015/0233094 A1* | 8/2015 | Maiyur | E02F 9/2253 701/50 |
| 2016/0297411 A1 | 10/2016 | Trombley et al. | |
| 2017/0066324 A1* | 3/2017 | Hertel | A01B 63/112 |
| 2017/0129558 A1* | 5/2017 | Gugel | B60W 10/06 |
| 2017/0253093 A1* | 9/2017 | Baum | B60C 23/002 |
| 2018/0123824 A1* | 5/2018 | Csabai | A01B 76/00 |
| 2020/0102009 A1 | 4/2020 | Owen et al. | |
| 2020/0139772 A1* | 5/2020 | Vogelpohl | B60C 23/00363 |
| 2020/0238990 A1* | 7/2020 | Ma | B60W 30/18 |
| 2020/0254829 A1* | 8/2020 | Schott | B60C 23/0479 |
| 2020/0269706 A1* | 8/2020 | Vande Haar | B60K 7/0007 |
| 2020/0269937 A1* | 8/2020 | Putz | B62D 21/186 |
| 2021/0016611 A1* | 1/2021 | Bechthold | B60C 23/00354 |
| 2021/0129669 A1* | 5/2021 | Vande Haar | B60K 17/043 |
| 2021/0129670 A1* | 5/2021 | Vande Haar | B62D 59/04 |
| 2021/0188240 A1* | 6/2021 | Wolff | B60W 10/20 |
| 2021/0237520 A1* | 8/2021 | Ehlert | B60C 23/002 |
| 2022/0289039 A1* | 9/2022 | Boaretto | B60K 6/48 |
| 2022/0408631 A1* | 12/2022 | Sakaguchi | B60Q 1/143 |
| 2023/0026988 A1* | 1/2023 | Subramanian | B60T 8/17616 |
| 2023/0121191 A1* | 4/2023 | Rust | B60L 7/18 701/22 |

FOREIGN PATENT DOCUMENTS

| | | |
|---|---|---|
| DE | 20 2011 051 292 U1 | 4/2012 |
| DE | 10 2016 208 792 A1 | 11/2017 |
| DE | 10 2020 006 574 A1 | 12/2020 |
| DE | 10 2019 124 281 A1 | 3/2021 |
| DE | 10 2020 106 757 A1 | 9/2021 |
| EP | 2 394 889 A1 | 12/2011 |
| EP | 2 604 495 A1 | 6/2013 |

OTHER PUBLICATIONS

European Patent Office, International Search Report issued in International patent application No. PCT/EP2022/082991 (Apr. 14, 2023).

European Patent Office, Written Opinion issued in International patent application No. PCT/EP2022/082991 (Apr. 14, 2023).

* cited by examiner

METHOD FOR TRACTION CONTROL OF A VEHICLE OR A VEHICLE COMBINATION

RELATED APPLICATIONS

This application claims the benefit under 35 U.S.C. § 371 as a U.S. National Phase Application of application no. PCT/EP2022/082991, filed on 23 Nov. 2022, which claims the benefit of German Patent Application no. 10 2021 133 758.5 filed on 17 Dec. 2021, the contents of which are hereby incorporated herein by reference in their entireties.

FIELD OF THE DISCLOSURE

The invention relates to a method for controlling the traction of a vehicle or a vehicle combination. The vehicles are wheeled vehicles. The vehicle combination comprises a traction vehicle and at least one trailer vehicle coupled thereto. The tractor vehicle is provided with a sensor device arranged on a coupling element of a trailer device, whereby, by means of the sensor device, in all the vehicle directions a respective coupling force transmitted by a counter-coupling element of the trailer vehicle to the coupling element of the tractor vehicle is measured and emitted as a force signal, whereby from the force signal, in an evaluation unit connected to the sensor device the coupling force acting in the vehicle direction concerned is determined and transmitted to an electronic control unit of the tractor vehicle, and whereby the traction of the tractor vehicle is adapted by the control unit to the properties of the ground surface over which the vehicle(s) is/are travelling.

The tractor vehicle of the vehicle combination considered here is preferably a towing machine such as a tractor, which is intended for use in agriculture and forestry, and which in each case is provided at the rear or at the front of the vehicle with a coupling element in the form of a trailer hitch such as a ball-head coupling or a coupling jaw. The associated trailer vehicle can be a solid drawbar trailer, a central axle trailer or a working device, which is provided with a counter-coupling element such as a coupling shell or a towing eye arranged on a solid drawbar or suspension. Likewise, a tractor vehicle of the vehicle combination considered in this context can be a semitrailer machine used in agriculture or forestry, such as an agro-truck with a fifth-wheel coupling element, and the associated trailer vehicle can be a semi-trailer with a supporting plate provided with a kingpin as the counter-coupling element.

With a vehicle combination of the type described it is assumed that on the coupling element of its trailer device the tractor vehicle is provided with a sensor device by means of which, in all three vehicle directions x, y, z, a coupling force Fx, Fy, Fz or a coupling force in the opposite direction −Fx, −Fy, −Fz transmitted by a counter-coupling element of the trailer vehicle to the coupling element of the tractor vehicle can be detected as a force signal.

BACKGROUND

DE 10 2018 106 856 A1 describes such a sensor device of a trailer device, which comprises a plurality of sensor elements respectively attached to webs of a measuring plate. Under loading of the trailer device, the webs of the measuring plate are elastically deformed. The sensor elements can be load cells, strain gauges, or SAW elements (SAW=Surface-Acoustic-Wave). In a tractor the measuring plate is preferably arranged between a screw-on plate fixed to the vehicle and a trailer bracket, to which the respective coupling element in the form of a towing hitch or a ball-head coupling is attached. By means of the sensor element of the measuring plate the forces and torques transmitted in or around all three vehicle directions x, y, z can be detected.

DE 10 2019 124 281 A1 describes a fifth-wheel coupling of a tractor-trailer unit with a sensor device for detecting the forces transmitted from a coupled semi-trailer via the fifth-wheel coupling to the tractor. The fifth-wheel coupling comprises a supporting bracket that can be attached to the vehicle chassis, on which a coupling plate is mounted and able to pivot about a horizontal transverse axis. For that purpose, the supporting bracket has two laterally arranged webs each having a supporting bracket eye, in each of which a damping element engages via a clamping element and a bearing insert to the coupling plate. In a first embodiment of the sensor device sensors, which can be strain gauges or piezo elements, are arranged on an intermediate element which is arranged between the damping element and the bearing insert and which deforms elastically when loaded by a coupled semi-trailer. In a second embodiment of the sensor device the sensors are arranged on the bearing insert, which is deformed elastically when loaded by coupling a semi-trailer.

A vehicle combination used for agriculture and forestry usually drives to the place where it is to be used over firm roads and tracks from a yard or a vehicle depot. During this, the tire air pressure of the wheel tires of the tractor and trailer vehicles is made relatively high so that the vehicle combination will have safe driving properties and will consume as little fuel as possible. For that purpose, drive axles that can be connected and disconnected, if they are present and if the trailer vehicle is not heavily loaded, are disconnected. In addition, lifting axles that can be raised or lowered are raised, and the air springs of non-driven, air-sprung vehicle axles are vented. When leaving a firm road or track, owing to the soft or loose and sometimes overgrown arable, meadow or forest ground the rolling resistance of the vehicle combination increases substantially and the traction of the tractor vehicle decreases, also substantially, which results in an increase of the fuel consumption of the tractor vehicle and the risk that the vehicle combination might get stuck. However, depending on the technical equipment of the tractor vehicle and the trailer vehicle various measures for increasing the traction of the tractor vehicle can be adopted, by which the rolling resistance of the vehicle combination is reduced, and the traction of the tractor vehicle increased, whereby the fuel consumption of the tractor vehicle can be reduced and sticking of the vehicle combination can be prevented. The measures for increasing the traction when leaving firm roads and tracks can be initiated manually by the driver, or they can take place automatically in combination with determining the nature of the ground surface being traversed.

A known measure for increasing the traction of a tractor vehicle during off-road use is to connect a not permanently driven drive axle of the tractor vehicle, if the latter is equipped with an all-wheel drive system that can be switched on, and/or the connection of a drive axle of the trailer vehicle that can be driven by the power take-off of the tractor vehicle when the trailer vehicle is designed as a driven-axle trailer.

DE 10 2007 028 277 A1 describes a motor vehicle with a connectable all-wheel drive system, and a drive slip regulation system. An associated control method provides that a slipping drive wheel of a permanently driven drive axle is braked if its drive slip value exceeds a first slip-limit value and a connectable drive axle is switched on if the drive slip value of the slipping drive wheel thereafter exceeds a second slip-limit value.

DE 10 2016 208 792 A1 describes a method for controlling an all-wheel clutch of a motor vehicle with an all-wheel drive system that can be switched on. The method provides that by means of a satellite navigation system and a digital road map the stretch lying immediately ahead of the motor vehicle is determined and a connectable drive axle is switched on if there is a risk of greater slip on the stretch ahead and the all-wheel clutch should therefore be closed.

A further known measure for increasing the traction of a tractor vehicle is to raise a non-driven vehicle axle which is close to the driven axle of the tractor vehicle, if this is in the form of a lifting axle, or to vent its spring bellows if it is air-sprung. By virtue of these measures the axle load and thus the traction of the drive axles of the tractor vehicle are increased. The same effect can also be achieved by raising a vehicle axle of the trailer vehicle if this is in the form of a lifting axle, or venting its spring bellows if it is air-sprung. By these measures the supporting load transferred from the trailer vehicle to the coupling element of the tractor vehicle, and hence the axle load on the drive axles usually arranged close to the coupling element, is increased.

DE 10 2008 054 044 A1 describes a method for controlling a lifting axle on a semi-trailer of a semi-trailer truck. In a starting-assistance mode the lifting axle of the semi-trailer is raised in order to increase the supporting load transferred by the saddle plate of the semi-trailer to the fifth-wheel coupling of the semi-trailer tractor and hence the axle load and the traction of the drive axles of the semi-trailer tractor. In this way the maximum permitted axle loads on the other vehicle axles of the semi-trailer when starting on firm ground are not exceeded, but they may be exceeded when starting on off-road surfaces.

A method for starting-assistance control of a semi-trailer truck according to DE 10 2004 010 561 A1 provides that the spring bellows of an air-sprung vehicle axle of the semi-trailer are vented in order to increase the supporting load transferred by the saddle plate of the semi-trailer to the fifth-wheel coupling of the semi-trailer tractor and hence the axle load and the traction of the drive axles of the semi-trailer tractor. If the semi-trailer tractor has a corresponding unloadable vehicle axle, this is first unloaded by venting its spring bellows before the vehicle axle of the semi-trailer is unloaded by venting its spring bellows.

To reduce the rolling resistance of the vehicle combination and to increase the traction of the tractor vehicle, the tire air pressure of the wheels of the tractor vehicle and the trailer can be reduced, provided that they are equipped with a tire pressure regulation system. By reducing the tire air pressure, the ground contact area of the wheel tires is increased so that the vehicle wheels sink less into the ground, whereby the rolling resistance of the vehicle combination is reduced, and the traction of the tractor vehicle is increased. As a positive side-effect, as a result of the lower ground pressure of the vehicle wheels the agricultural, meadow or forest ground is less severely compacted.

DE 20 2011 051 292 U1 described a method for controlling a tire pressure regulation system of a vehicle or vehicle combination, in which method, by means of a satellite navigation system and a digital road map it is determined whether the vehicle or vehicle combination is on a firm road or on off-road ground at the time. In accordance with the current driving position the tire pressure regulation system is operated either in a road mode with higher tire pressures or in an off-road mode with lower tire pressures.

Moreover, from DE 10 2019 210 325 A1 a method is known for the control of a tire pressure regulation system of a vehicle combination, in which method, with reference to the operating status of a working device coupled to a tractor vehicle it is recognized whether the vehicle combination is currently on a firm road or on off-road ground. For example, if the working device is a field sprayer with a spraying boom that can be moved in and out laterally, when the spraying boom is extended it can be assumed that the vehicle combination is on arable land and the tire air pressure of the vehicle tires should correspondingly be reduced. When the spraying boom is subsequently retracted again, it is assumed that the vehicle combination is travelling on a firm track and the tire air pressure is correspondingly increased.

Furthermore, according to DE 697 18 290 T2 there is the possibility of adjusting the motor control of the drive motor and the transmission control of the driving transmission of a tractor vehicle in accordance with characteristic values provided for use on roads or on off-road surfaces.

SUMMARY

Since with the known methods for controlling the traction of a vehicle or vehicle combination the ground surface over which the vehicle or vehicle combination is travelling is taken into account not at all or only indirectly, and thus relatively imprecisely, the purpose of the present invention is to indicate a method for controlling the traction of a vehicle or vehicle combination, of the type mentioned to begin with, in which the type or properties of the ground surface being driven on is determined more directly than before and the traction of the vehicle or tractor vehicle can be adapted more accurately to the ground surface concerned.

This objective is achieved by a method having the features specified in the present disclosure. Advantageous further developments of the method will be apparent from the present disclosure.

According to these, the invention relates first to a method for the traction control of a vehicle combination which comprises a tractor vehicle and at least one trailer vehicle coupled thereto, wherein the tractor vehicle is provided with a sensor device arranged on a coupling element of a trailer device, wherein by means of the sensor device, in all the vehicle directions x, y, z, a respective coupling force Fx, Fy, Fz transmitted from a counter-coupling element of the trailer vehicle to the coupling element of the tractor vehicle is measured and emitted as a force signal, wherein from the force signals the coupling force Fx, Fy, Fz acting in the respective vehicle directions x, y, z are determined in an evaluation unit connected to the sensor device and transmitted to an electronic control unit of the tractor vehicle, and wherein the traction of the tractor vehicle is adapted by means of the control unit to suit the properties of the ground surface being driven on.

To achieve the stated objective, in this method it is provided that properties of the ground surface being driven on are determined with reference to the dynamics of the coupling forces Fx, Fy, Fz, and this in such manner that in an evaluation unit the dynamic fractions are filtered out of consecutive sequences of the coupling forces Fx, Fy, Fz, and from these dynamic fractions of the coupling forces Fx, Fy, Fz a characteristic value $K_{Dyn}$ that characterizes the dynamics of the coupling forces Fx, Fy, Fz is determined and transmitted to the control unit, and in the control unit the characteristic value is compared with a stored limit value $K_{Dyn\_Gr}$ and at least one measure to increase the traction of the tractor vehicle is carried out if the characteristic value $K_{Dyn}$ has exceeded the limit value $K_{Dyn\_Gr}$ ($K_{Dyn} > K_{Dyn\_Gr}$), whereas the at least one measure is discontinued if the characteristic value $K_{Dyn}$ has fallen below the limit value $K_{Dyn\_Gr}$ ($K_{Dyn} < K_{Dyn\_Gr}$) again.

In the method according to the invention, it is assumed that the coupling forces Fx, Fy, Fz transmitted from the trailer vehicle to the coupling element of the tractor vehicle will fluctuate and oscillate substantially more markedly during off-road driving due to the uneven ground surface than would be the case when driving over a firm road or track, owing to the relatively flatter road surface in the latter case. Thus, with reference to the dynamics of the coupling forces Fx, Fy, Fz the condition of the ground surface over which the vehicle combination is driving can be determined directly and relatively accurately, at any rate enough so to be able to distinguish between driving on a road and driving off-road.

However, the method according to the invention can also be operated advantageously with a solo vehicle in the form of a wheeled vehicle. Such a solo vehicle is operated without a coupled trailer vehicle either normally or only when necessary. Such a solo vehicle can be connected at the rear by way of a trailer device or permanently, for example, to an agricultural or forestry working device or to an agricultural or forestry working machine. In an embodiment, these working devices or working machines can have no chassis of their own, so that when they are not activated they are raised off the ground.

Such agricultural or forestry working devices or working machines coupled to the vehicle also produce on the trailer device of the vehicle, both in their activated and in their non-activated position, forces in all three spatial directions which can be measured by the sensor device mentioned. The measured values so determined can likewise be used to determine the properties of the ground or roadway surface being travelled over by the vehicle at the time, so that knowing the nature of the ground surface concerned measures can be adopted in the vehicle to optimize its traction.

The invention is accordingly also advantageous for the operation of such solo vehicles. Thus, a method for controlling the traction of a vehicle is disclosed, which vehicle has a trailer device with a coupling element for attaching a counter-coupling element of an agricultural or forestry working device or working machine or some other object, wherein the coupling element of the trailer device of the vehicle is connected to a sensor device by means of which, in all the vehicle directions x, y, z, a respective coupling force Fx, Fy, Fz transmitted from the counter-coupling element to the coupling element of the trailer device of the vehicle is measured and emitted as a force signal, wherein from these force signals the coupling force Fx, Fy, Fz in each of the vehicle directions x, y, z is determined in an evaluation unit connected to the sensor device and transmitted to an electronic control unit of the vehicle, and wherein the traction of the vehicle is adapted by the control unit to suit the properties of the ground surface.

To achieve the stated objective this method is characterized in that the properties of the ground surface being covered are determined with reference to the dynamics of the coupling forces Fx, Fy, Fz. and this in such manner that in the evaluation unit the respective dynamic fractions are filtered out from consecutive sequences of the coupling forces Fx, Fy, Fz and from those dynamic fractions of the coupling forces Fx, Fy, Fz a characteristic value $K_{Dyn}$ that characterizes the dynamics of the coupling forces Fx, Fy, Fz is determined and transmitted to the control unit, and in the control unit the characteristic value $K_{Dyn}$ is compared with a stored limit value $K_{Dyn\_Gr}$, and at least one measure for increasing the traction of the vehicle is adopted if the characteristic value $K_{Dyn}$ exceeds the limit value $K_{Dyn\_Gr}$ ($K_{Dyn} > K_{Dyn\_Gr}$) whereas the at least one measure for increasing the traction is discontinued when the characteristic value $K_{Dyn}$ has fallen below the limit value $K_{Dyn\_Gr}$ ($K_{Dyn} < K_{Dyn\_Gr}$) again.

Recognizably, the characterizing features of the method that can be used with solo vehicles are the same as the characterizing features of the method for a vehicle combination. Accordingly, the advantages indicated above are again obtained.

The last-indicated method can thus also be used advantageously for a wheeled vehicle when no trailer vehicle, working device, or working machine is coupled. In that case, it is provided that before the vehicle begins driving, a counter-coupling element of a separated coupling mass is attached to the coupling element of the trailer device. This coupling mass takes over the method-related function of an agricultural or forestry working device or working machine, since while the vehicle is driving this separated coupling mass, excited by the movement of the vehicle and under the effect of the inertia, moves in a slightly fluctuating manner in all three spatial directions. These movements produce the often-mentioned forces on the coupling element of the trailer device of the vehicle, which are measured by the sensor device, then transformed into the relevant measurement values, and used for controlling the traction.

According to another method variant, it can be provided that the method is carried out without a trailer vehicle coupled to the coupling element of the trailer device of the vehicle, without a coupled agricultural or forestry working device or such a working machine, and without a coupled coupling mass, in which case the coupling forces Fx. Fy and Fz measured by the sensor device are produced by the mass of the coupling element of the trailer device of the vehicle alone.

Accordingly, to carry out the method it is sufficient for the vehicle to be equipped only with a trailer device whose coupling element is connected via the sensor device described to the supporting structure of the vehicle. Here, it is alone the mass of the coupling device of the trailer device of the vehicle, i.e., for example a coupling jaw with locking means or a coupling hook with a coupling ball, whose mass is capable of oscillation to a limited extent, is connected by way of the sensor device to the supporting structure of the vehicle. Clearly, carrying out the method according to the invention in a vehicle equipped in that manner requires the sensitivity of the sensor device to be very good, but that can be achieved.

The characteristic value $K_{Dyn}$ that characterizes the coupling forces Fx, Fy, Fz is preferably determined as an averaged RMS value of the dynamic fraction of the coupling forces Fx, Fy, Fz. The RMS value of a dynamic signal represents an effective value of the fluctuations and oscillations concerned and can be regarded as the average amplitude of the dynamic signal.

The duration of the sequences in which the dynamic fraction of the coupling forces Fx, Fy, Fz are determined and evaluated, can be between 5 and 90 seconds.

The possible measures for increasing the traction of the solo vehicle or the tractor vehicle, which were mentioned earlier when explaining the prior art, can be carried out individually or in a summative manner and automatically, as soon as, with reference to the dynamics of the coupling forces Fx, Fy, Fz, an off-road journey just commenced has been recognized.

However, it is also possible that the measures for increasing the traction of the solo vehicle or the tractor vehicle are indicated to the driver by a display and operation unit, and that at least one of these possible measures is only carried out after confirmation by the driver.

Furthermore, it can be provided that at least one of the measures is confirmed by the driver by pressing an OK-button on the display and operation unit or by touching an OK-touchpad in a display of the display and operation unit designed as a touch-screen.

The measure to be carried out for increasing the traction can be selected, for example, by repeatedly pressing a scroll button until an identifying display of the measure appears and subsequently pressing the OK-button of the display and operation unit, or by touching a selection touchpad on the display of the measure in a display and operation unit designed as a touch-screen.

BRIEF DESCRIPTION OF THE DRAWINGS

The method according to the invention is explained in greater detail below, with reference to an example embodiment illustrated in the attached figures, which show.

DETAILED DESCRIPTION

Figure 2A:
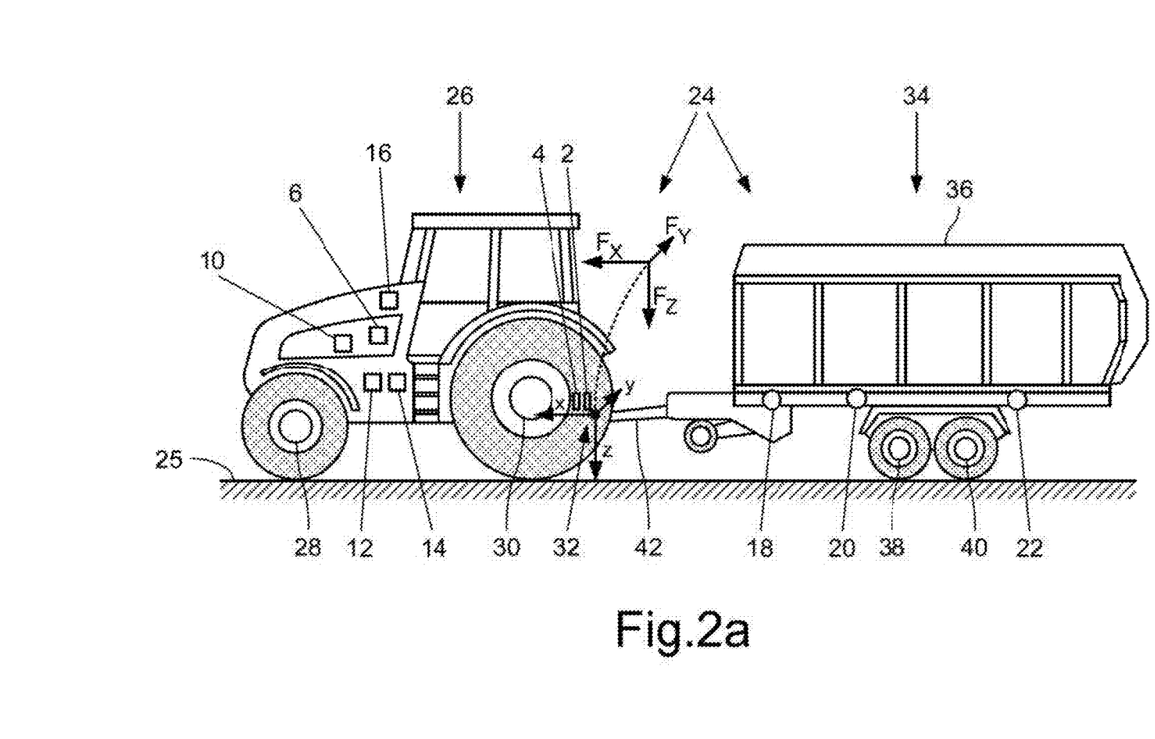
FIG. 2*a*: A first vehicle combination with a tractor vehicle and a trailer vehicle, in a first operating position of a lifting axle on the trailer vehicle.

FIG. 2*a* shows a first vehicle combination 24, which consists of a tractor as the towing vehicle 26 and a central-axle trailer coupled to it as the trailer vehicle 34. The tractor vehicle 26 has a front axle 28 and a rear axle 30 with vehicle wheels, and at its rear it is equipped with a trailer device 32, depicted only schematically, in the form of a trailer coupling. In this case the front axle 28, as an example, is in the form of a drive axle that can be activated, while in contrast the rear axle 30 is a permanently powered drive axle. The trailer coupling 32 can be in the form of a ball-head coupling, a jaw-and-pin coupling or a hook coupling. The trailer vehicle 34 is provide with a tilting body 34 which, to unload, can be tilted at least to the rear. The trailer vehicle 34 also comprises two central axles 38, 40 next to and one behind the other, with vehicle wheels. The foremost, first central axle 38 is in the form of a lifting axle which can be raised if needs be, whereas the rear, second central axle 40 is suspended solidly on the chassis of the trailer vehicle 34. To the front of the trailer vehicle 36 is attached solidly a tow-bar 42, which is articulated via a counter-coupling at the end (not visible in FIG. 2*a*) to the trailer coupling 32 of the tractor vehicle 26. The counter-coupling of the trailer vehicle 34 is adapted to fit the structure of the trailer coupling 32 of the tractor vehicle 26 and is consequently designed as a ball-socket coupling or as a towing eye.

In the operating position shown in FIG. 2*a*, the foremost central axle 38 or lifting axle of the trailer vehicle 34 is in its lowered normal position, in which the weight of the trailer vehicle 34 is distributed over both of the central axles 38, 40 and the supporting load Fz transmitted to the trailer coupling 32 of the tractor vehicle 26 is relatively small.

Figure 2B:
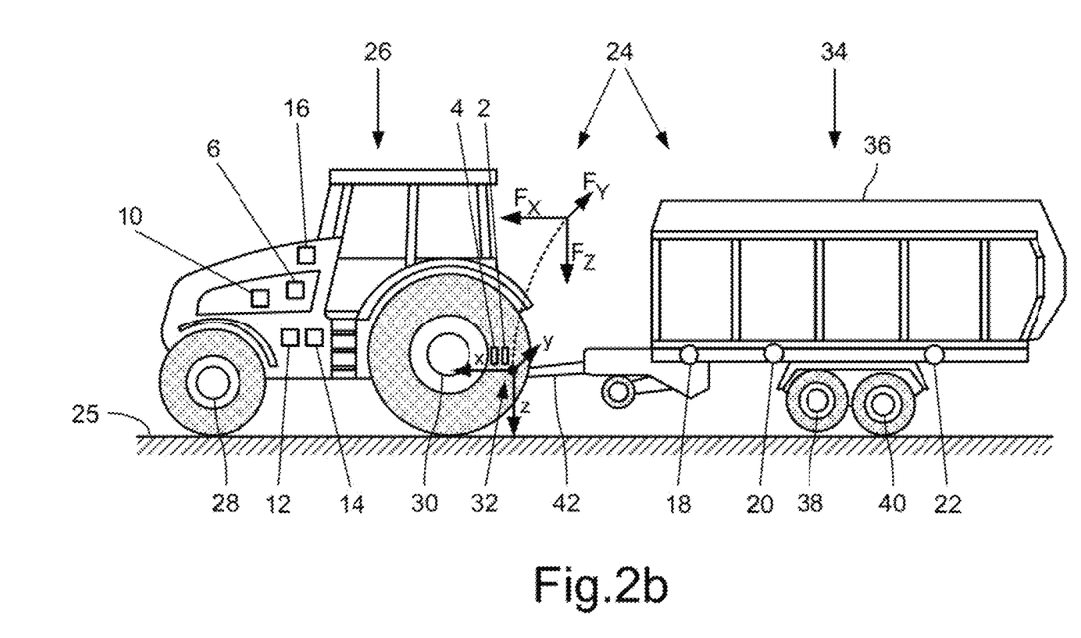
FIG. 2*b*: The first vehicle combination as in FIG. 2*a* in a second operating position of the lifting axle on the trailer vehicle.

In the operating position shown in FIG. 2*b*, the front central axle 38 of the trailer vehicle 34 is in its raised functional position, in which the weight of the trailer vehicle 34 is supported only by the rear central axle 40 and the supporting load Fz on the trailer coupling 32 of the tractor vehicle 26 is larger.

Figure 3A:
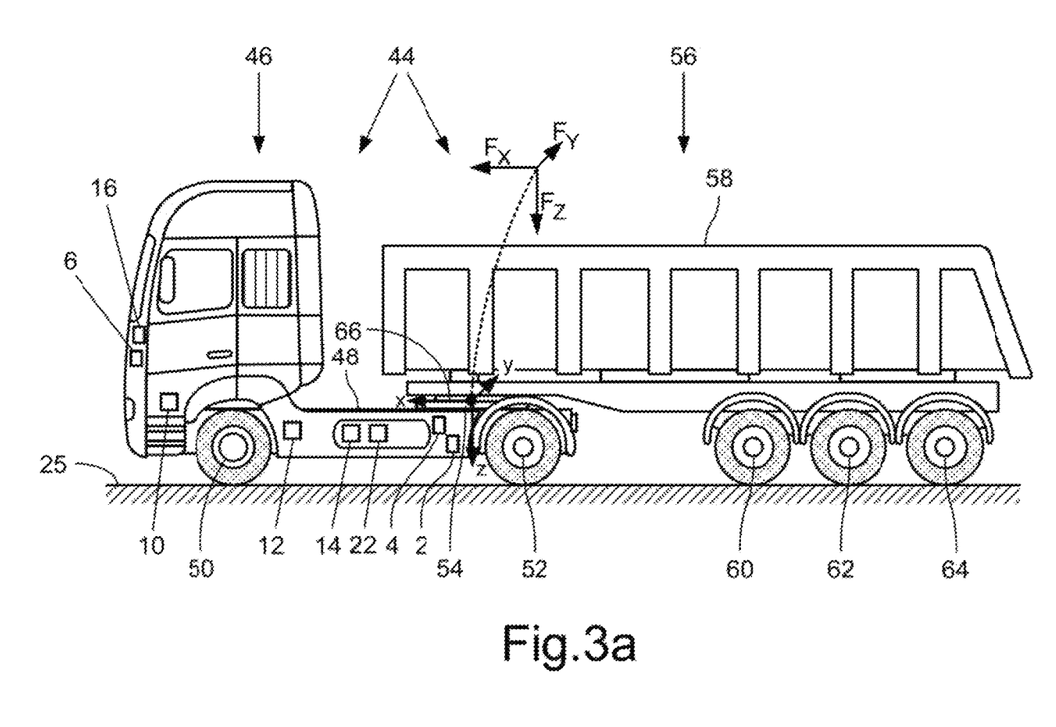
FIG. 3*a*: A second vehicle combination with a tractor vehicle and a trailer vehicle, in a first operating position of a lifting axle on the trailer vehicle.

FIG. 3*a* shows a second vehicle combination 44, which consists of a semi-trailer machine as the tractor vehicle 46 and coupled to that a semi-trailer as the trailer vehicle 56. The tractor vehicle 46 has a vehicle chassis 48, a front axle 50 and a rear axle 52 with vehicle wheels and is equipped in the rear area of the vehicle chassis 48 with a trailer device 54 in the form of a fifth-wheel coupling. The front axle 50 is, in this case as an example, designed as a connectable drive axle, while in contrast the rear axle 52 is in the form of a permanently powered drive axle. The trailer vehicle 56 is provided with a tilting body 58 which, for unloading, can be tilted at least to the rear and comprises three semi-trailer axles 60, 62 and 64 arranged close to one another and one behind another, with vehicle wheels. The foremost, first semi-trailer axle 60 is designed as a lifting axle which can be raised if necessary, whereas the two rear semi-trailer axles 62 and 64 are suspended fixed to the chassis of the trailer vehicle 56. In the front area of the trailer vehicle 56 is arranged a saddle plate 66 with a king-pin (not visible in FIG. 3*a*), which can pivot about a vertical axis and is connected to the fifth-wheel coupling 54 of the tractor vehicle 46.

In the operating position shown in FIG. 3*a* the lifting axle 60 of the trailer vehicle 56 is in its lowered, normal position in which the weight of the semi-trailer 56 is distributed over all three trailer axles 60, 62, 64 and the supporting force Fz transmitted to the fifth-wheel coupling 54 of the tractor vehicle 46 is relatively small.

Figure 3B:
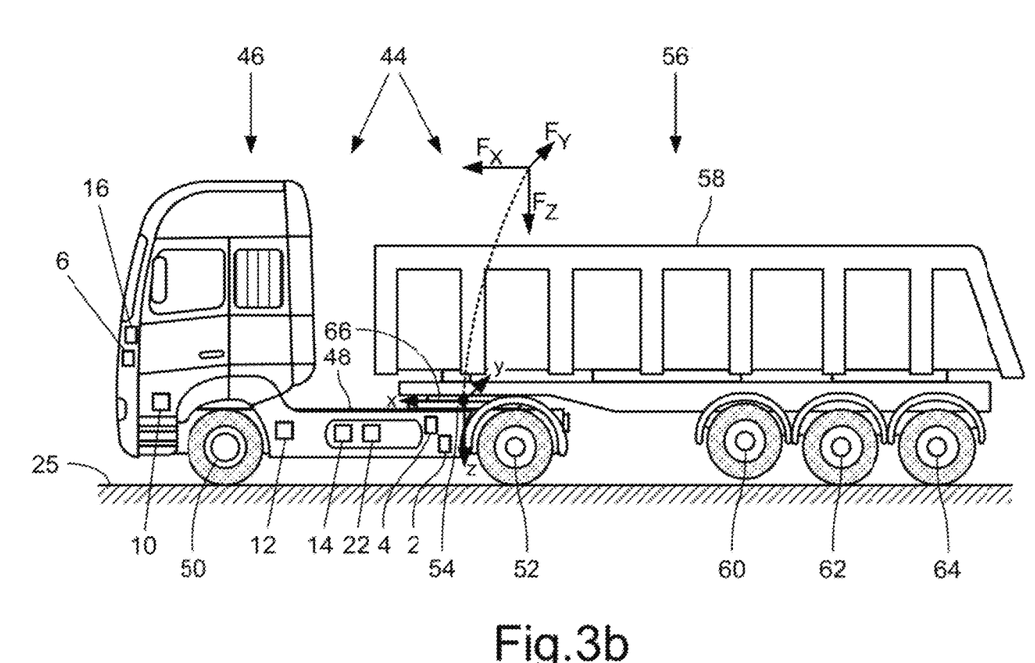
FIG. 3*b*: The second vehicle combination as in FIG. 3*a* in a second operating position of the lifting axle on the trailer vehicle.

In the operating position according to FIG. 3*b*, the lifting axle 60 of this trailer vehicle 56 is in its raised functional position, in which the weight of the semi-trailer 56 is supported only be the two rear trailer axles 62, 64 and the supporting load Fz transmitted to the fifth-wheel coupling 54 of the tractor vehicle 46 is larger.

Figure 1:
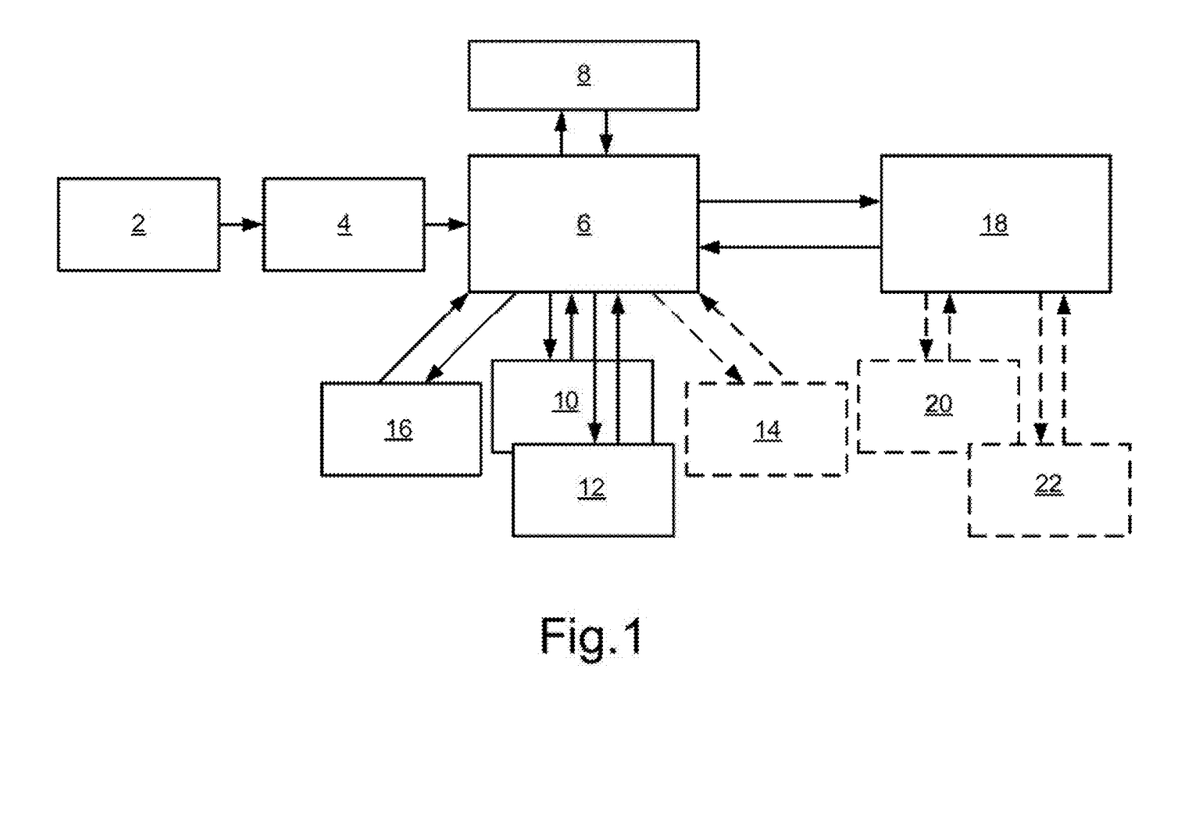
FIG. 1: A block flow-chart of the method for controlling the traction of a vehicle combination.

Below, with reference to the block flow-chart shown in FIG. 1, the method according to the invention for controlling the traction of a vehicle combination 24, 44 of the type described is explained. On the coupling element of the trailer device 32, 54 of the tractor vehicle 26, 46 there is in each case arranged a sensor device 2 by means of which, in all the vehicle directions x, y, z in each case a coupling force Fx, Fy, Fz transmitted from the counter-coupling element of the trailer vehicle 34, 56 to the coupling element of the tractor vehicle 26, 46 is detected as a force signal, from which in an evaluation unit 4 connected thereto the forces Fx, Fy, Fz acting in the respective vehicle directions x, y, z are determined and can be transmitted to an electronic control unit 6 of the tractor vehicle 26, 46.

According to the invention, it is provided that the ground surface over which the vehicle combination 24, 44 is travelling is determined with reference to the dynamics of the coupling forces Fx, Fy, Fz. For that purpose, in the evaluation unit 4 the respective dynamic fractions are filtered out of consecutive sequences of the coupling forces Fx, Fy, Fz with a duration between 5 and 90 seconds and from these a characteristic value $K_{Dyn}$ that characterizes the dynamics of the coupling forces Fx, Fy, Fz is determined and transmitted to the control unit 6 of the tractor vehicle 26, 46. In the control unit 6 the characteristic value $K_{Dyn}$ is compare with a limit value $K_{Dyn\_Gr}$ stored in an associated data memory 8. If the characteristic value $K_{Dyn}$ has exceeded the limit value $K_{Dyn\_Gr}$ ($K_{Dyn} > K_{Dyn\_Gr}$), at least one measure for increasing the traction of the tractor vehicle 26, 46 is carried out. When the characteristic value $K_{Dyn}$ has fallen below the limit value $K_{Dyn\_Gr}$ ($K_{Dyn} < K_{Dyn\_Gr}$) again, the at least one measure for increasing the traction is discontinued.

The characteristic value $K_{Dyn}$ that characterizes the dynamics of the coupling forces Fx, Fy, Fz is preferably determined as an averaged RMS value of the dynamic fractions of the coupling forces Fx, Fy, Fz. The RMS value of a dynamic signal represents an effective value of the fluctuations and oscillations concerned and can be regarded as the average amplitude of the dynamic signal.

In the present case it is assumed, as an example, that the tractor vehicle 26, 46 and the trailer vehicle 34, 56 comprise several means that can be used to increase the traction of the tractor vehicle 26, 46. As already described previously with reference to FIGS. 2a to 3b, the front axle 28, 50 of the tractor vehicle 26, 46 can be in the form of connectable drive axle. The traction of the tractor vehicle 26, 46 can then be increased by corresponding actuation of a transmission control unit 12 by means of which a shifting clutch for connecting the respective front axle 28, 50 so that it drives actively is engaged. Likewise, with reference to FIGS. 2a to 3b, it has also previously been described that the front axle 38, 60 of the trailer vehicle 34, 56 can be in the form of a lifting axle. The traction of the tractor vehicle 26, 46 can then be increased by corresponding actuation of a lifting axle control device 20 by an electronic control unit 18 of the trailer vehicle 34, 56 connected to the control unit 6 of the tractor vehicle, by means of which a lifting actuator for raising the lifting axle 38, 40 concerned is switched on. By raising the lifting axle 38, 40 the supporting load Fz transmitted to the trailer device 32, 54 of the tractor vehicle 26, 46, and hence also the axle load on the adjacent drive axle 30, 52 of the tractor vehicle 26, 46 is increased, and this results in better traction of the tractor vehicle 26, 46 The same effect could also be produced by venting the spring bellows when the front axles 38, 60 of the trailer vehicles 34, 56, instead of being in the form of lifting axles, are air-suspended on the respective vehicle chassis of the trailer vehicles 34, 56.

A further possibility for increasing the traction of the tractor vehicle 26, 46 consists in reducing the tire pressure of the vehicle wheels on all the vehicle axles 28, 30, 38, 40; 50, 52, 60, 62, 64 during off-road driving, provided that the traction vehicle 26, 46 and the trailer vehicle 34, 56 are each equipped with a tire pressure regulation unit. By reducing the tire air pressure, which takes place by correspondingly actuating a tire pressure regulation unit 14 of the tractor vehicle 26, 46 and a tire pressure regulation unit 22 of the trailer vehicle 34, 56, the wheel contact area of the wheel tires is increased so that the vehicle does not sink as deeply into the ground surface. Consequently, the rolling resistance of the vehicle combination 24, 44 is reduced and the traction of the tractor vehicle 26, 46 is increased. As a possible side-effect, the lower ground pressure of the vehicle wheels compact the arable, meadow or forest ground to a lesser extent.

Furthermore, to increase the traction of the tractor vehicle 26, 46 and to prevent the vehicle combination 24, 44 from getting stuck, it is also possible to adjust the motor control unit of the drive motor and the transmission control unit of the vehicle transmission of the tractor vehicle 26, 46 in accordance with characteristic curves which are provided for off-road use and which bring about a higher motor rotation speed and greater motor power of the drive motor, and increase the gear ratio of the vehicle transmission. The adjustment to characteristics for off-road use takes place by appropriate actuation of a motor control unit 10 and the transmission control unit 12.

The possible measures for increasing the traction of the tractor vehicle 26, 46 can be carried out automatically, as soon as, with reference to the dynamics of the coupling forces Fx, Fy and Fz, the beginning of an off-road journey has been recognized.

However, it is also possible that the measures for increasing the traction of the tractor vehicle 26, 46 are displayed to the driver in a display on a display and operating unit 16 connected to the control unit 6, and are carried out only after confirmation by the driver. The driver can signal his confirmation, for example, by pressing an OK-button of the display and operating unit 16 or by touching an OK touchpad in a display and operating unit 16 designed as a touch-screen.

It can also be provided that not all the possible measures for increasing the traction of the tractor vehicle 26, 46 are carried out, but that the driver can select from the possible measures for increasing the traction those which he wishes to be carried out. The measures for increasing the traction to be carried out can be selected, for example, by repeatedly pressing a scroll button until the particular measure is displayed and then pressing the OK-button of the display and operating unit 16, or by touching a selector touchpad in a display and operating unit 16 designed as a touch-screen.

Figure 4:
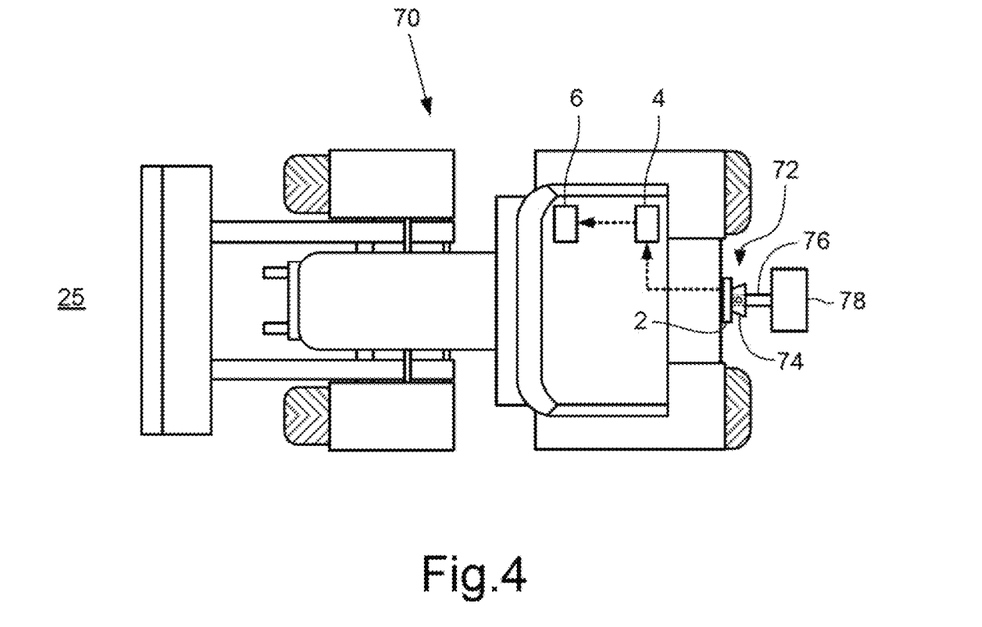
FIG. 4: A solo vehicle in the form of a tractor with a separated coupling mass attached to its trailer device.

FIG. 4 shows a vehicle 70 in the form of a tractor, at the rear of which is arranged a trailer device 72 with a coupling element 74 in the form of a coupling jaw. The coupling element 74 is connected by way of the sensor device 2 described in detail earlier to a supporting structure of the vehicle 70. By means of the trailer device 72 of the vehicle 70 a separate coupling mass 78 is connected. For that purpose, the separate coupling mass 78 comprises a counter-coupling element 76, which is introduced into the coupling element 74 of the trailer device 72 and locked therein. When the vehicle 70 drives over a ground surface 25 with varying properties, owing to its inertia the coupling mass 78 is excited into oscillations of varying strength relative to the vehicle 70 which produce related coupling forces in all three spatial directions in the trailer device 72. These are sensed by the sensor device 2 by the production of measurement values. The measurement values then serve, as already described, for carrying out in the vehicle measures that bring about a vehicle traction optimized for the ground surface 25 being covered. As described above, the measures can be selected and initiated automatically or manually by the driver.

LIST OF INDEXES (PART OF THE DESCRIPTION)

2 Sensor device
4 Evaluation unit
6 Electronic control unit
8 Data memory
10 Motor control unit
12 Transmission control unit
14 Tire pressure control unit of a tractor vehicle
16 Display and operating unit 18 Electronic control unit
20 Lifting axle control unit
22 Tire pressure control unit of a trailer vehicle
24 First vehicle combination
26 First towing vehicle, tractor
28 Front axle, drive axle (connectable)
30 Rear axle, drive axle
32 Trailer device, trailer coupling
34 First trailer vehicle, central-axle trailer
36 Tilting body of the trailer vehicle 34
38 First central axle, lifting axle
40 Second central axle
42 Tow-bar (with counter-coupling)
44 Second vehicle combination
46 Second tractor vehicle, semi-trailer tractor
48 Vehicle chassis
50 Front axle, drive axle (connectable)
52 Rear axle, drive axle
54 Trailer device, fifth-wheel coupling
56 Second trailer vehicle, semi-trailer
58 Tilting body
60 First semi-trailer axle, lifting axle
62 Second semi-trailer axle
64 Third semi-trailer axle
66 Saddle plate (with king-pin, not shown)
70. Vehicle, tractor, solo vehicle
72 Trailer device on the solo vehicle 70
74 Coupling element of the trailer device 72
76 Counter-coupling element
78 Coupling mass with counter-coupling element 76
Fx Coupling force in the x-direction
Fy Coupling force in the y-direction
Fz Coupling force in the z-direction
$K_{Dyn}$ Characteristic value
$K_{Dyn\_Gr}$ Limit value
x Longitudinal direction of the vehicle
y Transverse direction of the vehicle
z Vertical direction of the vehicle

The invention claimed is:

1. A method for controlling the traction of a vehicle combination having a tractor vehicle and at least one trailer vehicle coupled thereto, wherein the tractor vehicle is provided with a sensor device arranged on a coupling element of a trailer device, the method comprising:
transmitting, by means of the sensor device, in all the vehicle axes respective coupling forces from a counter-coupling element of the trailer vehicle to the coupling element of the tractor vehicle;
emitting the coupling forces as a force signal;
determining, by an evaluation unit connected to the sensor device, the coupling forces acting in the respective vehicle axes;
transmitting the coupling forces to an electronic control unit of the tractor vehicle;
determining properties of a ground surface driven on based on the coupling forces and with reference to dynamics of the coupling forces;
adapting a traction of the tractor vehicle, by the electronic control unit, to suit the properties of the ground surface driven on;
filtering, by the evaluation unit, respective dynamic fractions from consecutive sequences of the coupling forces;
determining a characteristic value from the dynamic fractions of the coupling forces, wherein the characteristic value characterizes the coupling forces;
transmitting the characteristic value to the control unit;
comparing, by the control unit, the characteristic value with a stored limit value;
determining that the characteristic value exceeds the stored limit value; and
increasing the traction of the tractor vehicle.

2. The method according to claim 1, wherein determining the characteristic value includes finding a RMS average value of the dynamic fractions of the coupling forces.

3. The method according to claim 1, wherein filtering the dynamic fractions includes filtering from consecutive sequences of the coupling forces having a duration from 5 seconds to 90 seconds.

4. The method according to claim 1, comprising:
determining that the ground surface is an off-road surface;
wherein increasing the traction of the vehicle includes adjusting the motor control unit of the drive motor and the transmission control unit of the transmission of the vehicle or the tractor vehicle in accordance with characteristic curves which are provided for off-road use and which bring about a higher motor rotation speed and motor power of the drive motor and a higher gear ratio of the transmission.

5. The method according to claim 1, comprising:
displaying to the driver possible measures for increasing the traction of the vehicle or the tractor vehicle in the display of a display and operating unit;
receiving confirmation from the driver for at least one of the measures; and
carrying out the at least one of the measures.

6. The method according to claim 5, wherein receiving confirmation of at least one of the measures by the driver includes receiving user input from an OK-button of the display and operating unit or from an OK-touchpad of a display of the display and operating unit designed as a touch-screen.

7. A method for controlling the traction of a vehicle having a trailer device with a coupling element for attaching a counter-coupling element of an agricultural or forestry working device or working machine or some other object, wherein the coupling element of the trailer device of the vehicle is connected to a sensor device, the method comprising:
transmitting, by the sensor device, in vehicle directions axes respective coupling forces from the counter-coupling element to the coupling element;
emitting the coupling forces as force signals;
determining from the force signals, by an evaluation unit connected to the sensor device, the coupling forces acting in the respective vehicle axes;
transmitting the coupling forces acting in the respective vehicle axes to an electronic control unit of the vehicle;
determining properties of a ground surface being driven on based on dynamics of the coupling forces in such manner that in the evaluation unit the respective dynamic fractions are filtered out from consecutive sequences of the coupling forces;
adapting a traction of the vehicle by the electronic control unit to suit the properties of the ground surface;
determining a characteristic value that characterizes the coupling forces from the dynamic fractions of the coupling forces;
transmitting the characteristic value to the control unit;
comparing, in the control unit, the characteristic value with a stored limit value;
determining that the characteristic value $K_{Dyn}$ has exceeded the limit value; and carrying out at least one measure for increasing the traction of the vehicle.

8. The method according to claim 7, comprising:
attaching to the coupling element of the trailer vehicle, before the vehicle begins driving, a counter-coupling element of a separate coupling mass.

9. The method according to claim 7, wherein the method is carried out without a trailer vehicle coupled to the coupling element of the trailer device of the vehicle, without a coupled agricultural or forestry working device or working machine, and without a coupled coupling mass, so that the coupling forces measured by the sensor device are produced solely by the mass of the coupling element of the trailer device of the vehicle.

10. The method according to claim 7, wherein determining the characteristic value includes finding a RMS average value of the dynamic fractions of the coupling forces.

11. The method according to claim 7, wherein filtering the dynamic fractions includes filtering from consecutive sequences of the coupling forces having a duration from 5 seconds to 90 seconds.

12. The method according to claim 7, comprising:
determining that the ground surface is an off-road surface; wherein increasing the traction of the vehicle includes adjusting the motor control unit of the drive motor and the transmission control unit of the transmission of the vehicle or the tractor vehicle in accordance with characteristic curves which are provided for off-road use and which bring about a higher motor rotation speed and motor power of the drive motor and a higher gear ratio of the transmission.

13. The method according to claim 7, comprising:
displaying to the driver possible measures for increasing the traction of the vehicle or the tractor vehicle in the display of a display and operating unit;
receiving confirmation from the driver for at least one of the measures; and
carrying out the at least one of the measures.

14. The method according to claim 13, wherein receiving confirmation of at least one of the measures by the driver includes receiving user input from an OK-button of the display and operating unit or from an OK-touchpad of a display of the display and operating unit designed as a touch-screen.

* * * * *